US008289879B2

(12) United States Patent
Brown

(10) Patent No.: US 8,289,879 B2
(45) Date of Patent: Oct. 16, 2012

(54) METHODS AND SYSTEMS FOR PREVENTING THE MISCONFIGURATION OF OPTICAL NETWORKS USING A NETWORK MANAGEMENT SYSTEM

(75) Inventor: Frederick Brown, Roswell, GA (US)

(73) Assignee: Ciena Corporation, Hanover, MD (US)

(*) Notice: Subject to any disclaimer, the term of this patent is extended or adjusted under 35 U.S.C. 154(b) by 749 days.

(21) Appl. No.: 12/027,945

(22) Filed: Feb. 7, 2008

(65) Prior Publication Data

US 2009/0201832 A1   Aug. 13, 2009

(51) Int. Cl.
 *H04L 12/28* (2006.01)
(52) U.S. Cl. ........................................ 370/254
(58) Field of Classification Search .................. None
 See application file for complete search history.

(56) References Cited

U.S. PATENT DOCUMENTS

| | | | | |
|---|---|---|---|---|
| 5,251,205 A * | 10/1993 | Callon et al. | | 370/392 |
| 5,430,727 A * | 7/1995 | Callon | | 370/401 |
| 5,991,814 A * | 11/1999 | Rzonca et al. | | 709/237 |
| 6,493,340 B1 * | 12/2002 | Kawanaka | | 370/392 |
| 6,549,932 B1 * | 4/2003 | McNally et al. | | 709/202 |
| 6,820,120 B1 * | 11/2004 | Keats et al. | | 709/223 |
| 6,944,631 B2 * | 9/2005 | Peter | | 1/1 |
| 7,009,934 B1 * | 3/2006 | Perkins et al. | | 370/228 |
| 7,023,793 B2 * | 4/2006 | Khambatkone et al. | | 370/218 |
| 7,139,242 B2 * | 11/2006 | Bays | | 370/238 |
| 7,234,163 B1 * | 6/2007 | Rayes et al. | | 726/22 |
| 7,391,720 B1 * | 6/2008 | Kuditipudi et al. | | 370/225 |
| 7,414,985 B1 * | 8/2008 | Tedijanto et al. | | 370/255 |
| 7,417,950 B2 * | 8/2008 | Hofmeister et al. | | 370/230 |
| 7,437,469 B2 * | 10/2008 | Ellanti et al. | | 709/229 |
| 7,525,981 B2 * | 4/2009 | Attarwala et al. | | 370/431 |
| 7,706,776 B2 * | 4/2010 | Zheng | | 455/410 |
| 7,826,453 B2 * | 11/2010 | Lin | | 370/392 |
| 8,045,551 B2 * | 10/2011 | Madrahalli et al. | | 370/389 |
| 2002/0030864 A1 * | 3/2002 | Chaudhuri et al. | | 359/110 |
| 2002/0112077 A1 * | 8/2002 | Semaan et al. | | 709/245 |
| 2004/0008727 A1 * | 1/2004 | See et al. | | 370/469 |
| 2004/0258007 A1 * | 12/2004 | Nam et al. | | 370/310 |
| 2005/0102423 A1 * | 5/2005 | Pelavin et al. | | 709/238 |
| 2005/0259571 A1 * | 11/2005 | Battou | | 370/217 |
| 2006/0031312 A1 * | 2/2006 | Ellanti et al. | | 709/206 |
| 2006/0133300 A1 * | 6/2006 | Lee et al. | | 370/254 |
| 2006/0227723 A1 * | 10/2006 | Vasseur et al. | | 370/254 |
| 2007/0115967 A1 * | 5/2007 | Vandenberghe et al. | | 370/389 |
| 2007/0127435 A1 * | 6/2007 | Antony et al. | | 370/351 |
| 2007/0211701 A1 * | 9/2007 | Smith et al. | | 370/356 |
| 2008/0056266 A1 * | 3/2008 | Lin | | 370/392 |
| 2008/0089244 A1 * | 4/2008 | Yu | | 370/255 |
| 2008/0159169 A1 * | 7/2008 | Benfield et al. | | 370/254 |
| 2010/0272438 A1 * | 10/2010 | Conklin et al. | | 398/58 |
| 2012/0030344 A1 * | 2/2012 | Karenos et al. | | 709/224 |
| 2012/0030572 A1 * | 2/2012 | Karenos et al. | | 715/734 |

* cited by examiner

*Primary Examiner* — Otis L Thompson, Jr.
(74) *Attorney, Agent, or Firm* — Clements Bernard PLLC; Christopher L. Bernard; Lawrence A. Baratta, Jr.

(57) ABSTRACT

The present invention provides methods and systems for preventing the misconfiguration of OSRP and OS/ISIS networks using a NMS, including: configuring a GNE with an address and NE ID for the NMS; forwarding topology information through a management interface to a NMS server; at the NMS server, copying a topology database of all NEs that are connected to the GNE; and, at the NMS server, launching NE mediators for all of the NEs in the topology database. Each NE mediator includes a listener that listens for updates and topology changes within the network.

22 Claims, 7 Drawing Sheets

METHODS AND SYSTEMS FOR PREVENTING THE MISCONFIGURATION OF OPTICAL NETWORKS USING A NETWORK MANAGEMENT SYSTEM

FIELD OF THE INVENTION

The present invention relates generally to the optical networking and optical communications fields. More specifically, the present invention relates to methods and systems for preventing the misconfiguration of Optical Signaling and Routing Protocol (OSRP) and Open Systems Interconnection/Intermediate System-Intermediate System (OSI/ISIS) networks using a Network Management System (NMS).

BACKGROUND OF THE INVENTION

Conventionally, when an Internet Protocol (IP) stack is first initialized or when a new IP address is added, gratuitous Address Resolution Protocol (ARP) requests are sent out for the IP addresses of the local machine. ARP is a mechanism for finding a host's hardware address when only its network layer address is known. The number of ARP requests sent out is monitored by an ARP Retry Count parameter, which has a default setting of three, for example. If a machine replies to one or more ARP requests, then the IP address is already in use. When this happens, a Windows-based machine still boots, however the interface containing the offending IP address is disabled, a system log entry is generated, and an error message is displayed. If the machine that is defending the IP address is also a Windows-based machine, a system log entry is generated and an error message is displayed on that machine as well. However, the ARP caches of many machines in the network could be corrupt and when the machine is brought up using a non-offending IP address it has to re-send an ARP request. This restores the original values in the ARP cache of the other machine.

A machine using a duplicate IP address can be started when it is not attached to the network, in which case no conflict is detected. However, if it is then plugged into the network, the first time that it sends an ARP request for another IP address any Windows-based machine with a conflicting IP address detects the conflict. The machine detecting the conflict displays an error message and logs a detailed event in the system log. A sample event log entry is: the system detected an IP address conflict for IP address 199.199.40.123 with the system having network hardware address 00:DD:01:OF:7A:B5. Network operations on this system are disrupted as a result. Dynamic Host Configuration Protocol (DHCP)-enabled clients inform the DHCP server when an IP address conflict is detected and, instead of invalidating the IP stack, request a new IP address from the DHCP server. They also request that the DHCP server flag the conflicting IP address as corrupt.

For an Open Shortest Path First (OSPF) network, link state advertisements are used to determine if there are duplicate router identifications (IDs). A duplicate router ID can be detected and propagated to other routers in the OSPF area. However, a user must manually go to every router in the network and use a series of commands to show the router ID and determine the address.

OSRP is an optical routing protocol similar to PNNI (Private Network-to-Network Interface) and MPLS (Multiprotocol Label Switching), which was developed for Asynchronous Transfer Mode (ATM) networks. Through OSRP, switches can exchange information about the network and the status of switches and links. OSRP works in an environment of switches that handles multiple wavelengths of light as circuits, automatically provisioning entire wavelengths or fractions of wavelengths available on a fast-switched basis.

Open Systems Interconnection/Intermediate System-Intermediate System (OSI/IS-IS) is an OSI link-state hierarchical routing protocol that floods a network with link-state information to build a picture of network topology. OSI/IS-IS operates by sending "hello" packets to all OSI/IS-IS enable interfaces to discover neighbors and establish topology.

Conventionally, OSRP and OSI/IS-IS-based networks do not include mechanisms to quickly and efficiently determine which router or machine is causing a network problem. Thus, the user Man take days to determine the identify of the router, machine, or switch in question in response to network problems, such as misconfiguration.

BRIEF SUMMARY OF THE INVENTION

The present invention provides novel methods and systems for avoiding the misconfiguration of Optical Signaling and Routing Protocol (OSRP) and Open Systems Interconnection/Intermediate System-Intermediate System (OSI/ISIS) networks using a Network Management System (NMS). OSRP consists of a routing function that allows for the discovery of neighbors and link status similar to Open Shortest Path First (OSPF) networks, Asynchronous Transfer Mode (ATM) networks, Asynchronous Optical Networks (ASONs), and Generalized Multi-Protocol Label Switching (GMPLS) networks. ISIS networks using the OSI model also have a routing function that allows for the discovery of neighbors.

OSRP and OSI/ISIS through packet exchange of the communications channel of an optical or copper link in a network allow for the exchange of topology information. Each node in the network exchanges Hello packets with its immediate neighbors and thereby determines its local state information. This local state information includes the identity and status of its links to its neighbors. Each node then bundles its local state information in a Topology State Element (TSE), which is flooded through the peer group.

When neighboring nodes at either end of an OSI or ISIS link being initialized through the exchange of Hello packets conclude that they are in the same network, they proceed to synchronize their topology databases. Database synchronization involves the exchange of information between neighboring nodes, resulting in the nodes having identical router/switch topology databases.

In one exemplary embodiment of the present invention, a method for preventing the misconfiguration of OSRP and OSI/ISIS networks using a NMS, includes: configuring a Gateway Network Element (GNE) with an address and Network Element (NE) Target Identifier (ID) for the NMS; forwarding topology information through a management interface to a NMS server; at the NMS server, copying a topology database of all NEs that are connected to the GNE; and, at the NMS server, launching NE mediators for all of the NEs in the topology database. Each NE mediator includes a listener that listens for updates and topology changes within the network. The NMS server repeats gathering the topology information for each NE that is learned of in the network through the GNE. If at any point during the topology information gathering there is a duplicate address, the NMS server asserts a severe alarm for an error condition related to the duplicate address found in the network. The duplicate address is detected by searching the topology database at the NMS server for any duplicate addresses. Preferably, the NMS server searches the topology database at a predetermined interval. Optionally, the predetermined interval is every 30 seconds. When a new NE is discovered by the NMS through a Hello protocol established for the NE, a difference is revealed by comparing an existing database of addresses and corresponding system identifier for an address on the NMS server and a newly discovered NE's address and system identifier. If an address is found on the topology database, then an alarm is asserted with an existing Target ID and a newly discovered Target ID in the alarm's information field. The alarm contains the name of the alarm and a duplicate address along with two machine name system identifiers. Optionally, the topology information and the topology database comprise one of OSRP topology information and an OSRP topology database and OSI topology information and an OSI topology database.

In another exemplary embodiment of the present invention, a system for preventing the misconfiguration of OSRP and OSI/ISIS networks using a NMS, includes: a NMS operable for configuring a GNE with its address and NE ID; a management interface operable for forwarding topology information to a NMS server; at the NMS server, all algorithm for copying a topology database of all NEs that are connected to the GNE; and, at the NMS server, an algorithm for launching NE mediators for all of the NEs in the topology database. Again, each NE mediator includes a listener that listens for updates and topology changes within the network. The NMS server repeats gathering the topology information for each NE that is learned of in the network through the GNE. If at any point during the topology information gathering there is a duplicate address, the NMS server asserts a severe alarm for an error condition related to the duplicate address found in the network. The duplicate address is detected by searching the topology database at the NMS server for any duplicate addresses. Preferably, the NMS server searches the topology database at a predetermined interval. Optionally, the predetermined interval is every 30 seconds. When a new NE is discovered by the NMS through a Hello protocol established for the NE, a difference is revealed by comparing an existing database of addresses and corresponding system identifier for an address on the NMS server and a newly discovered NE's address and system identifier. If an address is found on the topology database, then an alarm is asserted with an existing Target ID and a newly discovered Target ID in the alarm's information field. The alarm contains the name of the alarm and a duplicate address along with two machine name system identifiers. Optionally, the topology information and the topology database comprise one of OSRP topology information and an OSRP topology database and OSI topology information and an OSI topology database.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

Again, the present invention provides novel methods and systems for avoiding the misconfiguration of Optical Signaling and Routing Protocol (OSRP) and Open Systems Interconnection/Intermediate System-Intermediate System (OS/ISIS) networks using a Network Management System (NMS). OSRP consists of a routing function that allows for the discovery of neighbors and link status similar to Open Shortest Path First (OSPF) networks, Asynchronous Transfer Mode (ATM) networks, Asynchronous Optical Networks (ASONs), and Generalized Multi-Protocol Label Switching (GMPLS) networks. ISIS networks using the OSI model also have a routing function that allows for the discovery of neighbors.

OSRP and OSI/ISIS through packet exchange of the communications channel of an optical or copper link in a network allow for the exchange of topology information. Each node in the network exchanges Hello packets with its immediate neighbors and thereby determines its local state information. This local state information includes the identity and status of its links to its neighbors. Each node then bundles its local state information in a Topology State Element (TSE), which is flooded through the peer group.

Figure 1:
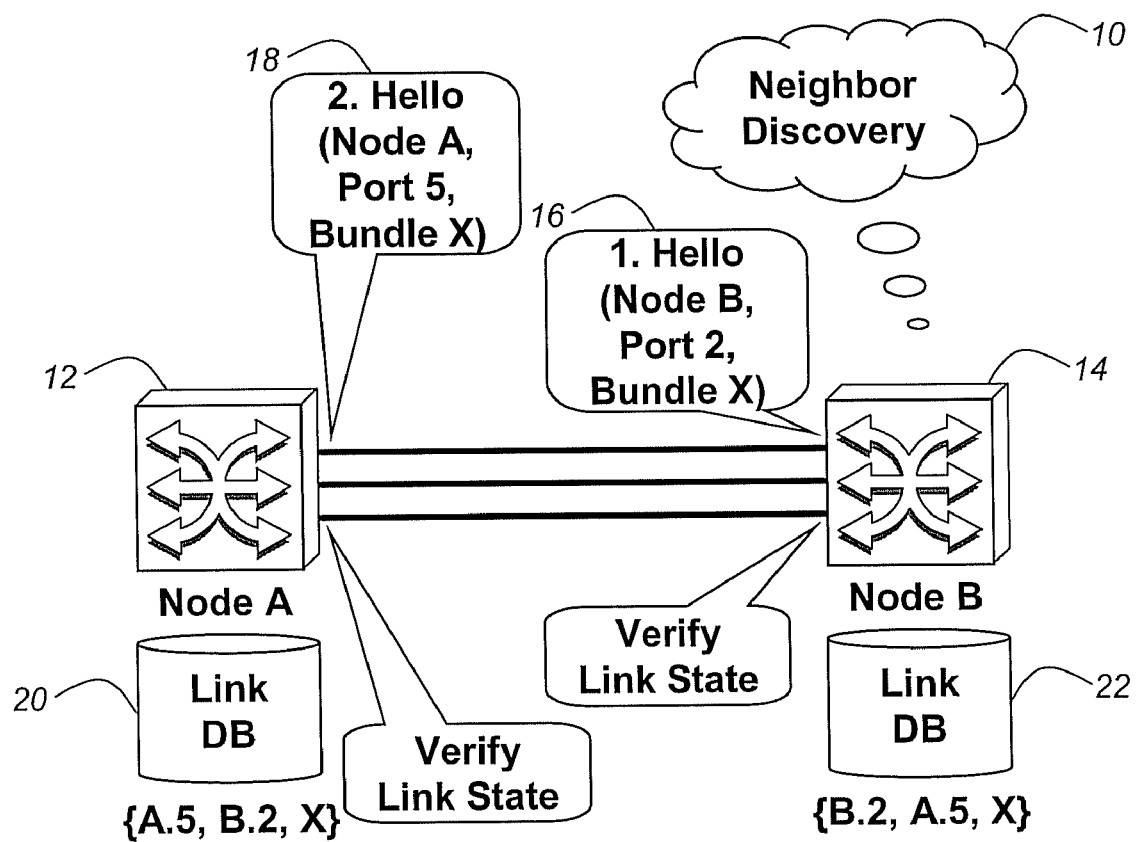
FIG. 1 is a schematic diagram illustrating the operation of a Hello protocol run over each logical link of an Optical Signaling and Routing Protocol (OSRP) or Open Systems Interconnection/Intermediate System-Intermediate System (OSI/ISIS) network to discover and verify neighboring nodes, ports, and protections bundles in accordance with the methods and systems of the present invention.

FIG. 1 is a schematic diagram illustrating the operation of a Hello protocol 10 run over each logical link of an OSRP or OSI/ISIS network to discover and verify neighboring nodes, ports, and protections bundles in accordance with the methods and systems of the present invention. Nodes A and B 12 and 14 periodically exchange Hello messages 16 and 18 in order to verify their link state. Optionally, this exchange is event triggered. As a result, each node 12 and 14 builds a link database 20 and 22 containing this topology information. For example, the link database 20 of Node A 12 contains the information {A.5, B.2, X}, indicating connectivity through Node A, Port 5, and Node B, Port 2, with Bundle X. Likewise, the link database 22 of Node B 14 contains the information {B.2, A.5, X}, indicating connectivity through Node B, Port 2, and Node A, Port 5, with Bundle X. The nodes A and B 12 and 14 can, for example, include routers, switches, optical network elements, and the like.

When neighboring nodes at either end of an OSI or ISIS link being initialized through the exchange of Hello packets conclude that they are in the same network, they proceed to synchronize their topology databases. Database synchronization involves the exchange of information between neighboring nodes, resulting in the nodes having identical router/switch topology databases.

Figure 2:
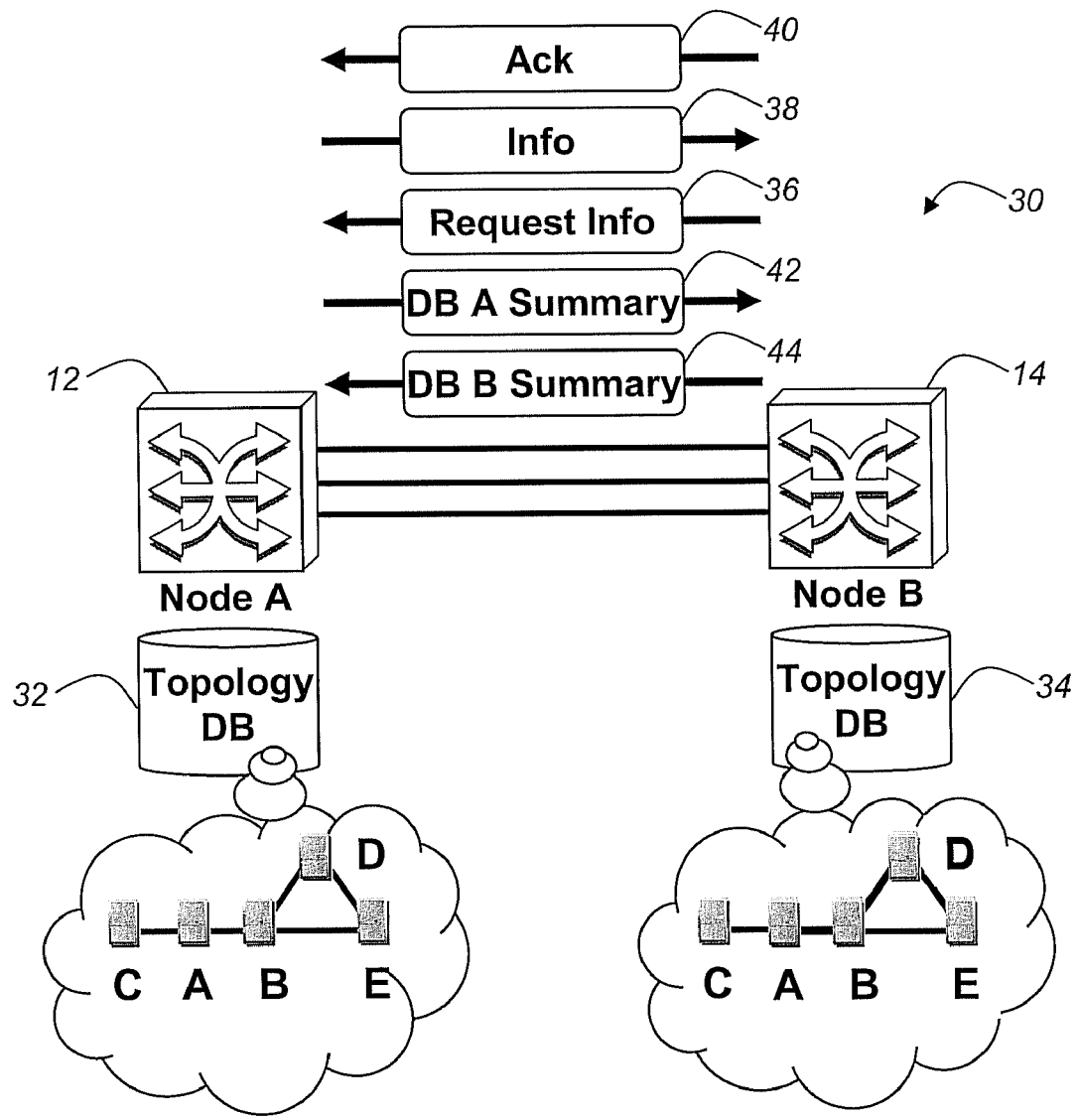
FIG. 2 is a schematic diagram illustrating the bi-directional exchange of topology state messages and database summaries in accordance with the methods and systems of the present invention.

FIG. 2 is a schematic diagram illustrating the bi-directional exchange of topology state messages and database summaries in accordance with the methods and systems of the present invention. This process 30 allows identical topology databases 32 and 34 to be maintained at each node 12 and 14.

Any links can be used and it is independent of the number of links involved. Again, the 30 process can be event triggered. Updates are typically requested with new, more recent topology database entries. The process involves a request for information 36, the exchange of the information 38, and appropriate acknowledgment 40 in sending a Topology Database A Summary 42 from Node A 12 to Node B 14 and a Topology Database B Summary 44 from Node B 14 to Node A 12.

The Hello protocol used in OSI routing protocols and OSRP defines messages that are exchanged between neighboring nodes. This data structure includes the routing protocol state information as well as the following attributes:

| | |
|---|---|
| Target ID/ Node ID | An identifier that uniquely identifies the node in the routing domain. This is assigned during OSI or OSRP stack initialization and cannot be changed while the node is operational (i.e. while the node has any adjacencies, Hello Finite State Machines (FSMs) are in any state other than Down, or there are any topology database entries). |
| Port ID | An identifier that uniquely identifies the physical port on the node described by the Hello data structure. This is assigned by the node and has only local significance. |
| Remote Node ID/ Target ID | The Target ID of the neighbor node on the other end of the link. The Remote Node ID is obtained when Hello messages are received from the neighbor. |
| Remote Port ID/ Target ID | The Port ID of the neighbor node on the other end of the link. The Remote Port ID is obtained when Hello messages are received from the neighbor. When the Remote Port ID is not known, its value is set to zero. |

The FSM configures the following parameters to define the behavior of the protocol between OSRP neighbors (these parameters are not currently accessible through a user interface):

| | |
|---|---|
| Hello Interval | The amount of time, in seconds, between Hello messages that the node sends out over the link, in the absence of event-triggered Hello messages. |
| Hello Timer | An interval timer that fires every Hello Interval seconds. When the Hello Timer fires, the node transmits a Hello message over the link. The Hello Timer is jittered in order to avoid the synchronized transmission of Hello messages. |
| Inactivity Factor | The amount of time, in multiples of the Hello interval declared by a neighboring node in its Hello messages, before the node considers the link Down if the neighboring node's Hello messages cease to arrive. |
| Inactivity Timer | A single-shot timer whose firing indicates that no Hello messages have been received from the neighboring node recently. The initial value of the Inactivity Timer is set to the Inactivity Factor times the Hello Interval from the most recent Hello message received from the neighboring node. |
| Hold Down Interval | The Hold Down Interval defines the minimum amount of time that the node must wait before sending out the next Hello message. As separate Hold Down Timer is used to measure this interval. Because Hello messages are sent in response to events, as well as periodically, this controls the overall Hello message transmission frequency. |

The NMS that manages one or more Network Elements (NEs) has an overall view of the network. The NMS manages the traffic and communications between the various NEs within the network. It accomplishes this by means of a management interface, such as a Common Object Request Broker Architecture (CORBA). The NMS generally includes a computer program configured to operate on a computer server. The computer server is configured with a network interface operable to communicate to one or more of the NEs. Additionally, the NMS can include an Operation Support System (OSS), Element Management System (EMS), and the like.

The NMS learns of the OSRP topology database by configuring a gateway Network Element (GNE) with its OSRP address and NE Target ID. The NEs forward OSRP topology information through the CORBA to the NMS server. The NMS server then makes a copy of the OSRP topology database of all of the nodes that are connected to the GNE. NE mediators are started on the NMS server for the GNE. The NMS server launches NE mediators for all of the nodes in the OSRP topology database. Each NE mediator has a listener that listens for OSRP updates and topology changes within the network and updates the OSRP topology within the network. The NMS server repeats gathering OSRP topology information for each node that is learned of in the network through the GNE. If at any point during the OSRP topology information gathering there is a duplicate OSRP address, the NMS server asserts a severe alarm for the error condition related to the duplicate OSRP address found in the network. This is accomplished by searching the OSRP topology database at the NMS server for any duplicate OSRP addresses. This is done by the NMS server every 30 seconds or at another specified interval.

When a new NE is discovered by the NMS through the Hello protocol established for the NE, a difference is revealed by comparing the existing OSRP database of addresses and corresponding system identifier for the address on the NMS server and the newly discovered NE's address and system identifier. If the address is found on the NMS server OSRP topology database, then an alarm is asserted with the existing Target ID and the newly discovered Target ID in the alarm's information field. The alarm contains the name of the alarm, such as "duplicate address found," and the duplicate address along with the two machine name system identifiers.

Figure 3:
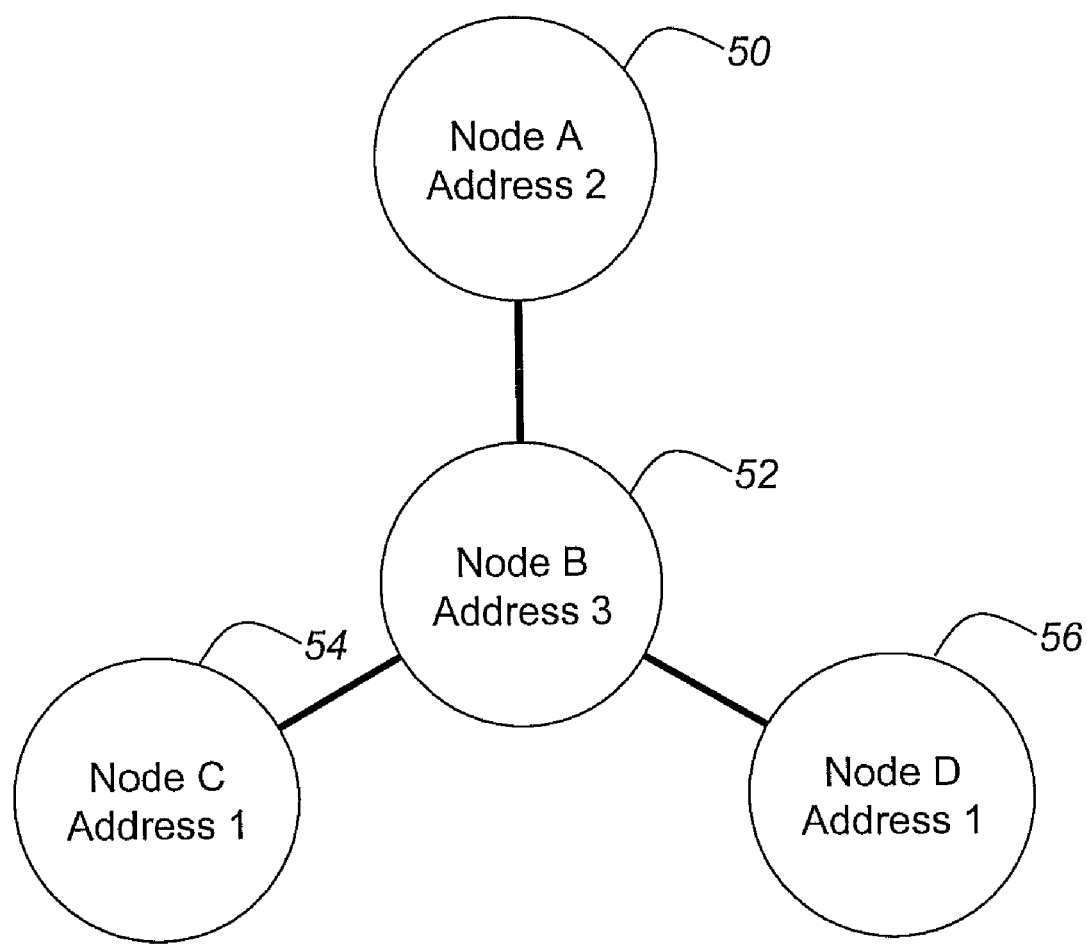
FIGS. 3 and 4 are schematic diagrams illustrating the assertion of an alarm based on the presence of a duplicate address (Address 1) in an OSRP network in accordance with the systems and methods of the present invention.
Figure 4:
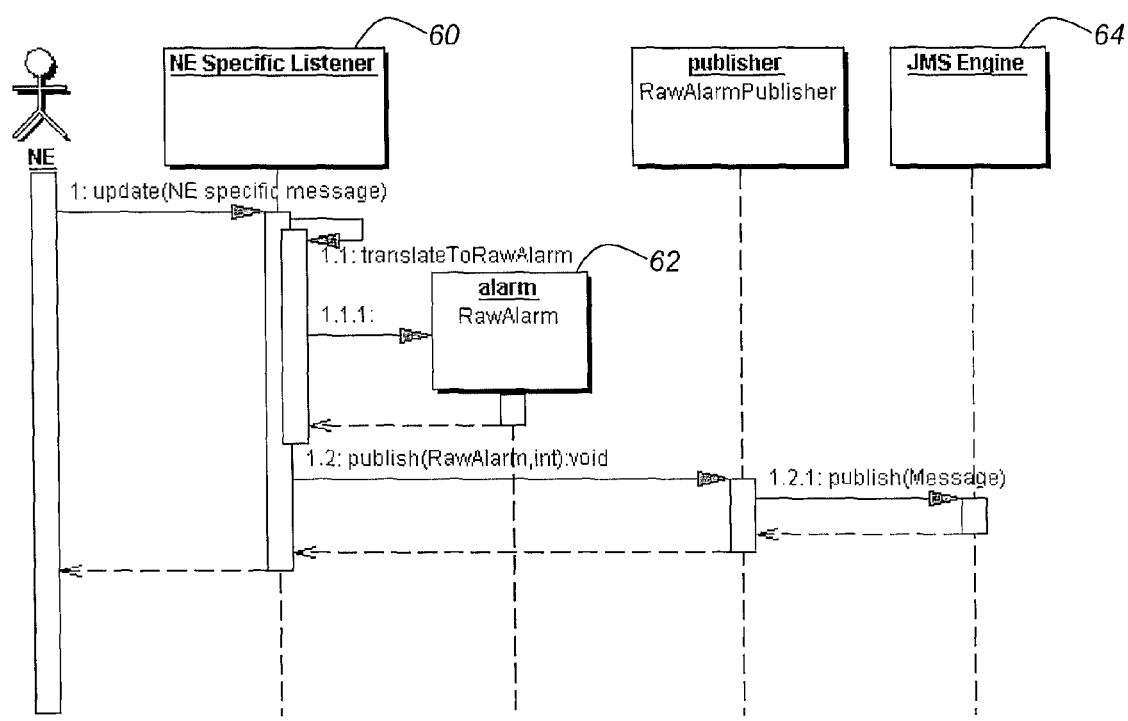

FIGS. 3 and 4 are schematic diagrams illustrating the assertion of an alarm based on the presence of a duplicate address (Address 1) in an OSRP network in accordance with the systems and methods of the present invention. As is illustrated in FIG. 3, Node A 50 has Address 2, Node B 52 has Address 3, and Nodes C and D 54 and 56 both have Address 1. Referring to FIG. 4, the NE-specific listener 60 is required due to OSRP protocol and data content differences. Raw-Alarm 62 is an object structure that the NMS server can ingest. JMS Engine 64 resides on the NMS server for periodic polling to determine alarm assertion.

In the case of OSI and ISIS routing, the NMS learns of the OSI topology database in a similar manner by configuring a GNE with its OSI area address and NE Target ID. The system identifier consists of the area address prefix and NE Target ID. The GNE forwards the OSI topology information through the CORBA to the NMS server. The NMS server then makes a copy of the OSI topology database of all of the nodes that are connected to the GNE. At this point, NE mediators are started on the NMS server for the GNE. The NMS server launches a NE mediator for each of the OSI nodes in the OSI topology database. Each NE mediator has a listener that listens for OSI updates and topology changes within the network and updates the OSI topology within the network. The NMS server repeats gathering OSI topology information for each node that is learned of in the network through the GNE. If at any point during the OSI topology information gathering there is a duplicate OSI address, the NMS server asserts a severe alarm for the error condition related to the duplicate OSI address found in the network. This is accomplished by searching the OSI topology database at the NMS server for any duplicate OSI addresses. This is done by the NMS server every 30 seconds or at another specified interval. When a new NE is discovered by the NMS through the Hello protocol established for the NE, a difference is revealed by comparing the existing OSI database of addresses and corresponding system identifier for the address on the NMS server and the newly discovered NE's address and system identifier. If the address is found on the NMS server OSI topology database, then an alarm is asserted with the existing Target ID and the newly discovered Target ID in the alarm's information field. The alarm contains the name of the alarm, such as "duplicate address found," and the duplicate address along with the two machine name system identifiers.

Figure 5:
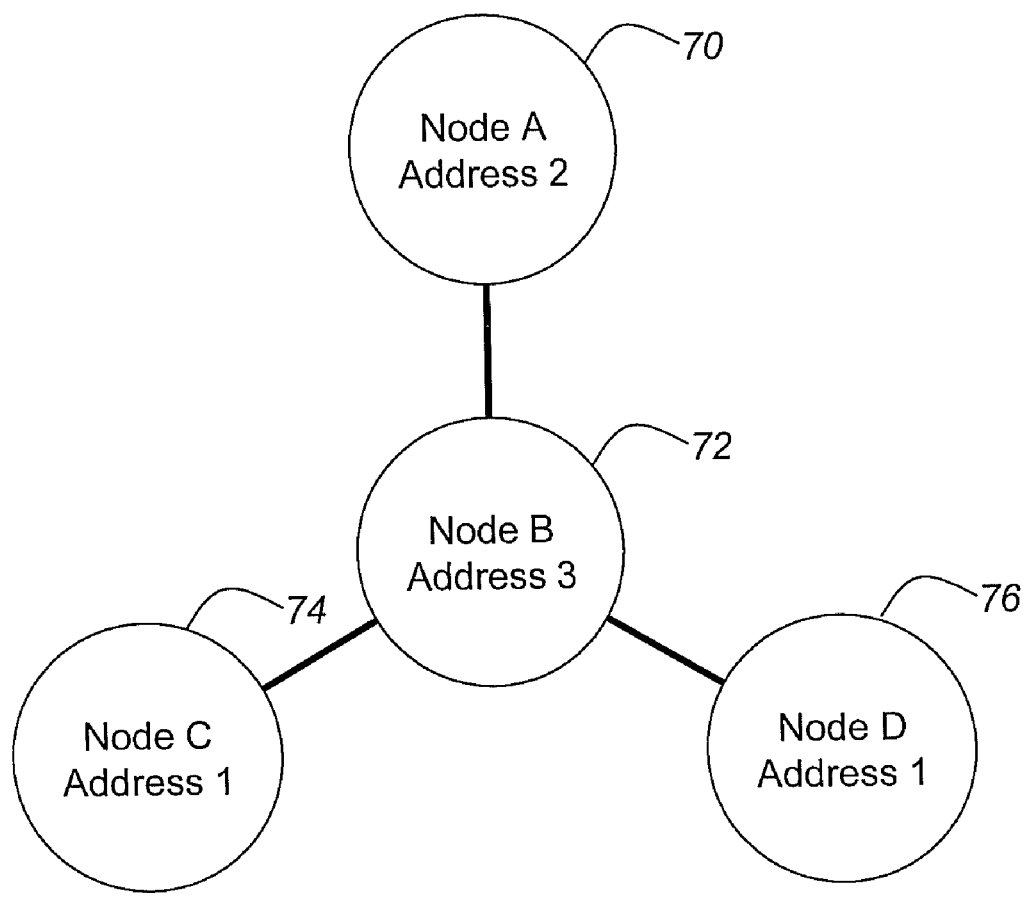
FIGS. 5 and 6 are schematic diagrams illustrating the assertion of an alarm based on the presence of a duplicate NSAP/NET address (Address 1) in an OSI/ISIS network in accordance with the systems and methods of the present invention.
Figure 6:
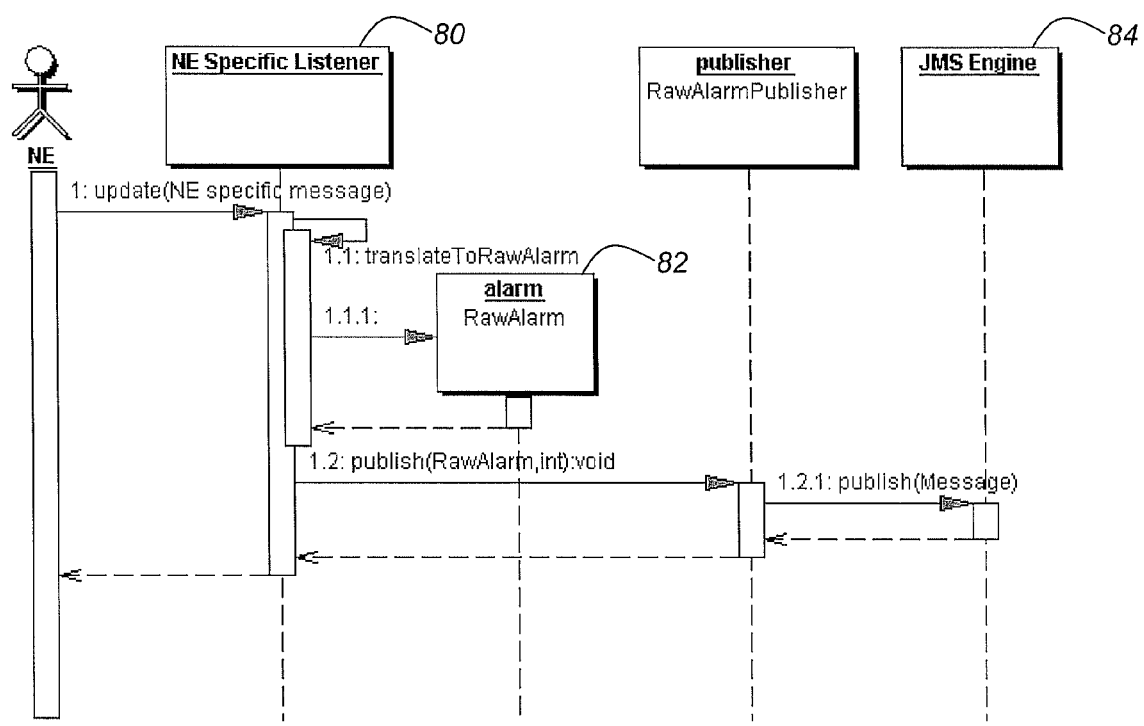

FIGS. 5 and 6 are schematic diagrams illustrating the assertion of an alarm based on the presence of a duplicate address (Address 1) in an OSI/ISIS network in accordance with the systems and methods of the present invention. As is illustrated in FIG. 5, Node A 70 again has Address 2, Node B 72 again has Address 3, and Nodes C and D 74 and 66 again both have Address 1. Referring to FIG. 6, the NE-specific listener 80 is required due to OSI/ISIS protocol and data content differences. RawAlarm 82 is an object structure that the NMS server can ingest. JMS Engine 84 resides on the NMS server for periodic polling to determine alarm assertion.

Figure 7:
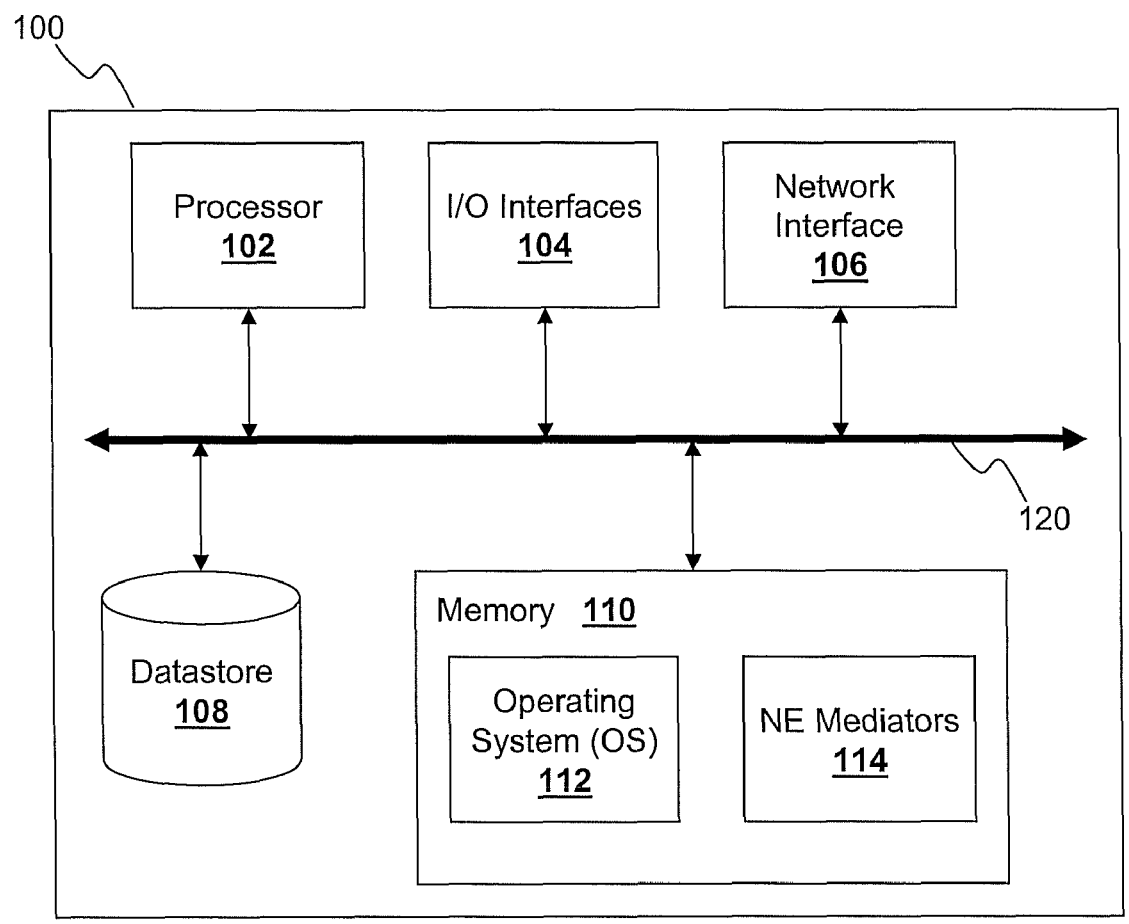
FIG. 7 is a block diagram illustrating a Network Management System (NMS) configured to provide operations, administration, maintenance, and provisioning (OAM&P) for multiple NEs and to provide monitoring of topology changes in accordance with the systems and methods of the present invention.

FIG. 7 is a block diagram illustrating a NMS 100 configured to provide operations, administration, maintenance, and provisioning (OAM&P) for multiple NEs and to provide monitoring of topology changes in accordance with the systems and methods of the present invention. The NMS 100 can be a digital computer that, in terms of hardware architecture, generally includes a processor 102, input/output (I/O) interfaces 104, network interfaces 106, a data store 108, and memory 110. The components (102, 104, 106, 108, and 110) are communicatively coupled via a local interface 120. The local interface 120 can be, for example but not limited to, one or more buses or other wired or wireless connections, as is known in the art. The local interface 120 can have additional elements, which are omitted for simplicity, such as controllers, buffers (caches), drivers, repeaters, and receivers, among many others, to enable communications. Further, the local interface 120 can include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the NMS 100, a semiconductor-based microprocessor (in the form of a microchip or chip set), or generally any device for executing software instructions. When the NMS 100 is in operation, the processor 102 is configured to execute software stored within the memory 110, to communicate data to and from the memory 110, and to generally control operations of the NMS 100 pursuant to the software instructions.

The I/O interfaces 104 can be used to receive user input from and/or for providing system output to one or more devices or components. User input can be provided via, for example, a keyboard and/or a mouse. System output can be provided via a display device and a printer (not shown). I/O interfaces 104 can include, for example, a serial port, a parallel port, a small computer system interface (SCSI), an infrared (IR) interface, a radio frequency (RF) interface, and/or a universal serial bus (USB) interface.

The network interfaces 106 can be used to enable the NMS 100 to communicate on a network. For example, the NMS 100 can utilize the network interfaces 106 to communicate to the NEs. Typically, NEs include network interfaces to provide communication to the NMS 100. Alternatively, the NMS can communicate to a gateway NE with a network interface, and the gateway NE interfaces OAM&P information, such as topology updates, to the NMS 100. The network interfaces 106 can include, for example, all Ethernet card (e.g., 10BaseT, Fast Ethernet, Gigabit Ethernet) or a wireless local area network (WLAN) card (e.g., 802.11a/b/g). The network interfaces 106 can include address, control, and/or data connections to enable appropriate communications on the network.

A data store 108 can be used to store data, such as information received from NEs. The data store 108 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 can incorporate electronic, magnetic, optical, and/or other types of storage media. In one example, the data store 108 can be located internal to the NMS 100 such as, for example, an internal hard drive connected to the local interface 120 in the NMS 100.

The memory 110 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 can have a distributed architecture, where various components are situated remotely from one another, but can be accessed by the processor 102.

The software in memory 110 can include one or more software programs, each of which includes an ordered listing of executable instructions for implementing logical functions. In the example of FIG. 7, the software in the memory system 110 includes a suitable operating system (O/S) 212 and NE mediators software 114. The operating system 112 essentially controls the execution of other computer programs, such as the NE mediators software 114 and other OAM&P software (not shown), and provides scheduling, input-output control, file and data management, memory management, and communication control and related services.

In an exemplary embodiment of the present invention, the NMS 100 is configured to receive topology information, such as topology databases from all NEs within the view of the NMS 100, through a CORBA interface through the network interface 106. The NMS 100 is configured to make a copy of all received topology databases. The NE mediators software 114 includes a listener for all NEs, and the listener is configured to monitor updates and topology changes. The NMS 100 is configured to monitor for topology misconfigurations through the NE mediators software 114 by comparing changes, e.g. NEs with new addresses, to the copies of all the received topology databases. This monitoring enables the NMS 100 to quickly detect misconfigurations, e.g. duplicate addresses, and quickly notify a system administrator.

Advantageously, the methods and systems of the present invention provide a quicker way to recognize and diagnose problem configurations in a telecommunications network and reduce potential network outages caused by duplicate node addresses.

Although the present invention has been illustrated and described herein with reference to preferred embodiments and specific examples thereof, it will be readily apparent to those of ordinary skill in the art that other embodiments and/or examples can perform similar functions and/or achieve like results. All such equivalent embodiments and/or examples are within the spirit and scope of the present invention, are contemplated thereby, and are intended to be covered by the following claims.

What is claimed is:

1. A method for preventing network misconfigurations in an optical network using a Network Management System, comprising:
   configuring a Gateway Network Element with an address and Network Element Target Identifier for a Network Management System, wherein the Gateway Network Element utilizes an optical routing protocol with hello packets to communicate with other Network Elements, wherein the optical routing protocol maintains topology at a wavelength level;
   forwarding topology information through a management interface comprising Common Object Request Broker Architecture to a Network Management System server;
   at the Network Management System server, copying a topology database of all Network Elements that are connected to the Gateway Network Element; and
   at the Network Management System server, launching Network Element mediators for all of the Network Elements in the topology database, wherein the Network Element mediators are configured to monitor the optical routing protocol for hello packets with topology updates to detect misconfigurations;
   wherein the Gateway Network Element and Network Elements comprise switches that collectively handle multiple wavelengths of light as circuits utilizing the optical routing protocol with hello packets for control thereof.

2. The method of claim 1, wherein each Network Element mediator comprises a listener that listens for updates and topology changes within the network.

3. The method of claim 1, wherein the Network Management System server repeats gathering the topology information for each Network Element that is learned of in the network through the Gateway Network Element.

4. The method of claim 3, wherein, if at any point during the topology information gathering there is a duplicate address, the Network Management System server asserts a severe alarm for an error condition related to the duplicate address found in the network.

5. The method of claim 4, wherein the duplicate address is detected by searching the topology database at the Network Management System server for any duplicate addresses.

6. The method of claim 5, wherein the Network Management System server searches the topology database at a predetermined interval.

7. The method of claim 6, wherein the predetermined interval comprises every 30 seconds.

8. The method of claim 1, wherein, when a new Network Element is discovered by the Network Management System through a Hello protocol established for the Network Element, a difference is revealed by comparing an existing database of addresses and corresponding system identifier for an address on the Network Management System server and a newly discovered Network Element's address and system identifier.

9. The method of claim 8, wherein, if an address is found on the topology database, then an alarm is asserted with an existing Target Identifier and a newly discovered Target Identifier in the alarm's information field.

10. The method of claim 9, wherein the alarm contains the name of the alarm and a duplicate address along with two machine name system identifiers.

11. The method of claim 1, wherein the topology information and the topology database comprise one of Optical Signaling and Routing Protocol topology information and an Optical Signaling and Routing Protocol topology database and Open Systems Interconnection topology information and an Open Systems Interconnection topology database.

12. A system for preventing optical network misconfigurations using a Network Management System, comprising:
   a Network Management System operable for configuring a Gateway Network Element with its address and Network Element Target Identifier, wherein the Gateway Network Element utilizes an optical routing protocol with hello packets to communicate with other Network Elements, wherein the optical routing protocol maintains topology at a wavelength level;
   a management interface operable for forwarding topology information to a Network Management System server using Common Object Request Broker Architecture;
   at the Network Management System server, an algorithm for copying a topology database of all Network Elements that are connected to the Gateway Network Element; and
   at the Network Management System server, an algorithm for launching Network Element mediators for all of the Network Elements in the topology database, wherein the Network Element mediators are configured to monitor the optical routing protocol for hello packets with topology updates to detect misconfigurations;
   wherein the Gateway Network Element and Network Elements comprise switches that collectively handle multiple wavelengths of light as circuits utilizing the optical routing protocol with hello packets for control thereof.

13. The system of claim 12, wherein each Network Element mediator comprises a listener that listens for updates and topology changes within the network.

14. The system of claim 12, wherein the Network Management System server repeats gathering the topology information for each Network Element that is learned of in the network through the Gateway Network Element.

15. The system of claim 14, wherein, if at any point during the topology information gathering there is a duplicate address, the Network Management System server asserts a severe alarm for an error condition related to the duplicate address found in the network.

16. The system of claim 15, wherein the duplicate address is detected by searching the topology database at the Network Management System server for any duplicate addresses.

17. The system of claim 16, wherein the Network Management System server searches the topology database at a predetermined interval.

18. The system of claim 17, wherein the predetermined interval comprises every 30 seconds.

19. The system of claim 12, wherein, when a new Network Element is discovered by the Network Management System through a Hello protocol established for the Network Element, a difference is revealed by comparing an existing database of addresses and corresponding system identifier for an address on the Network Management System server and a newly discovered Network Element's address and system identifier.

20. The system of claim 19, wherein, if an address is found on the topology database, then an alarm is asserted with an existing Target Identifier and a newly discovered Target Identifier in the alarm's information field.

21. The system of claim 20, wherein the alarm contains the name of the alarm and a duplicate address along with two machine name system identifiers.

22. The system of claim 12, wherein the topology information and the topology database comprise one of Optical Signaling and Routing Protocol topology information and an Optical Signaling and Routing Protocol topology database and Open Systems Interconnection topology information and an Open Systems Interconnection topology database.

* * * * *